United States Patent [19]

Frye

[11] 4,310,137

[45] Jan. 12, 1982

[54] SELF HOLDING SEPARABLE MOUNT

[76] Inventor: Bruce J. Frye, Rte. 3, Box 76, Luck, Wis. 54853

[21] Appl. No.: 185,366

[22] Filed: Sep. 8, 1980

[51] Int. Cl.³ .............................................. A47F 7/14
[52] U.S. Cl. ............................... 248/467; 248/205 A; 428/40; 428/514; 428/311.3; 428/308.8; 428/322.7
[58] Field of Search .................................. 428/40, 514

[56] References Cited

U.S. PATENT DOCUMENTS

| 2,438,195 | 3/1946 | Tierney | 428/514 |
| 3,098,272 | 7/1963 | Frye | 24/67 |
| 3,241,795 | 3/1966 | Frye | 248/28 |
| 3,311,339 | 3/1967 | Frye | 248/205 A |
| 3,409,257 | 11/1968 | Elm | 248/65 |
| 3,856,249 | 12/1974 | Frye | 248/205 A |
| 3,885,768 | 5/1975 | Frye | 248/467 |
| 4,003,538 | 1/1977 | Frye | 248/467 |

Primary Examiner—John D. Welsh
Attorney, Agent, or Firm—Leo Gregory

[57] ABSTRACT

A surface mount for removably adhesively attaching an object to a supporting surface, the mount being separable for the ready removal of the object held with a readily separable outward portion of the mount and the remainder of the mount being subsequently carefully removed from the supporting surface free of the held object.

4 Claims, 10 Drawing Figures

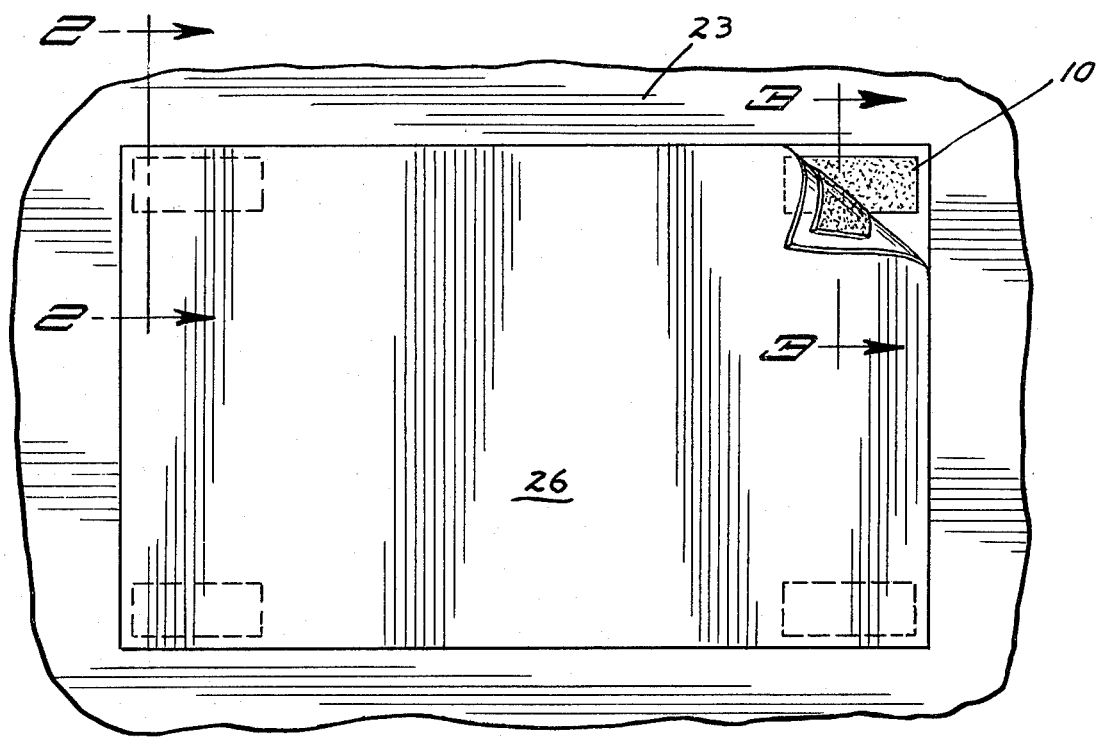
FIG. 1
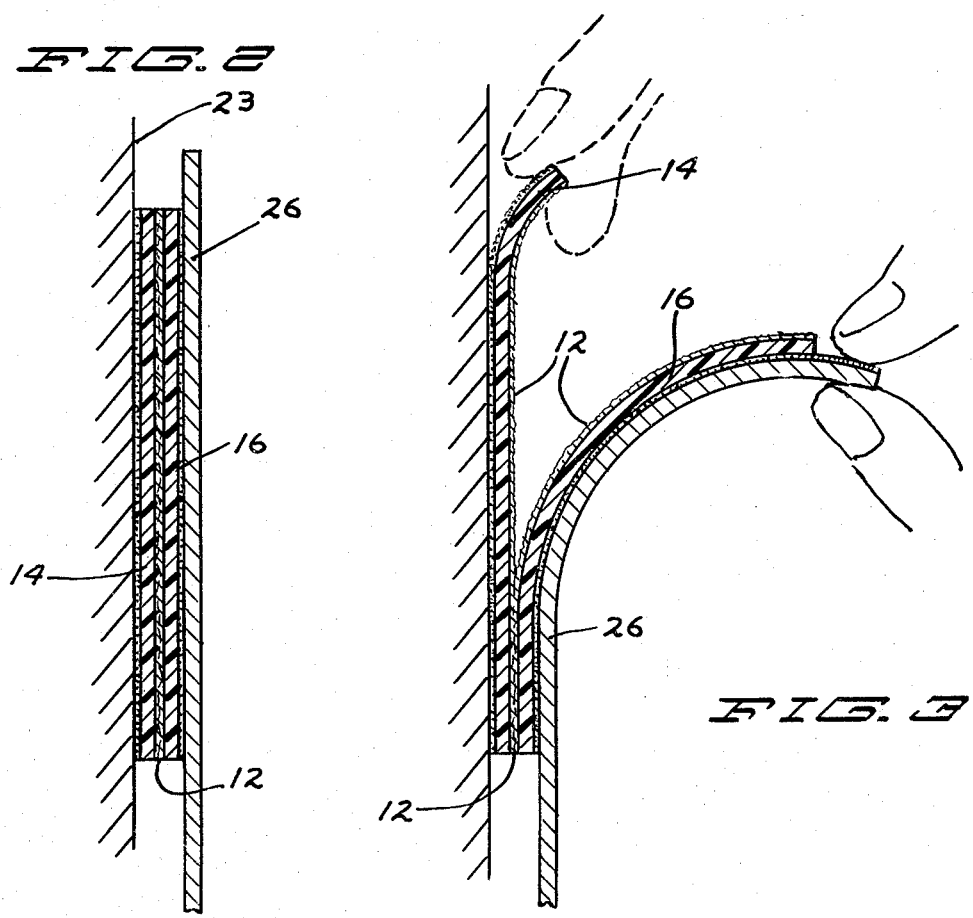
FIG. 2
FIG. 3

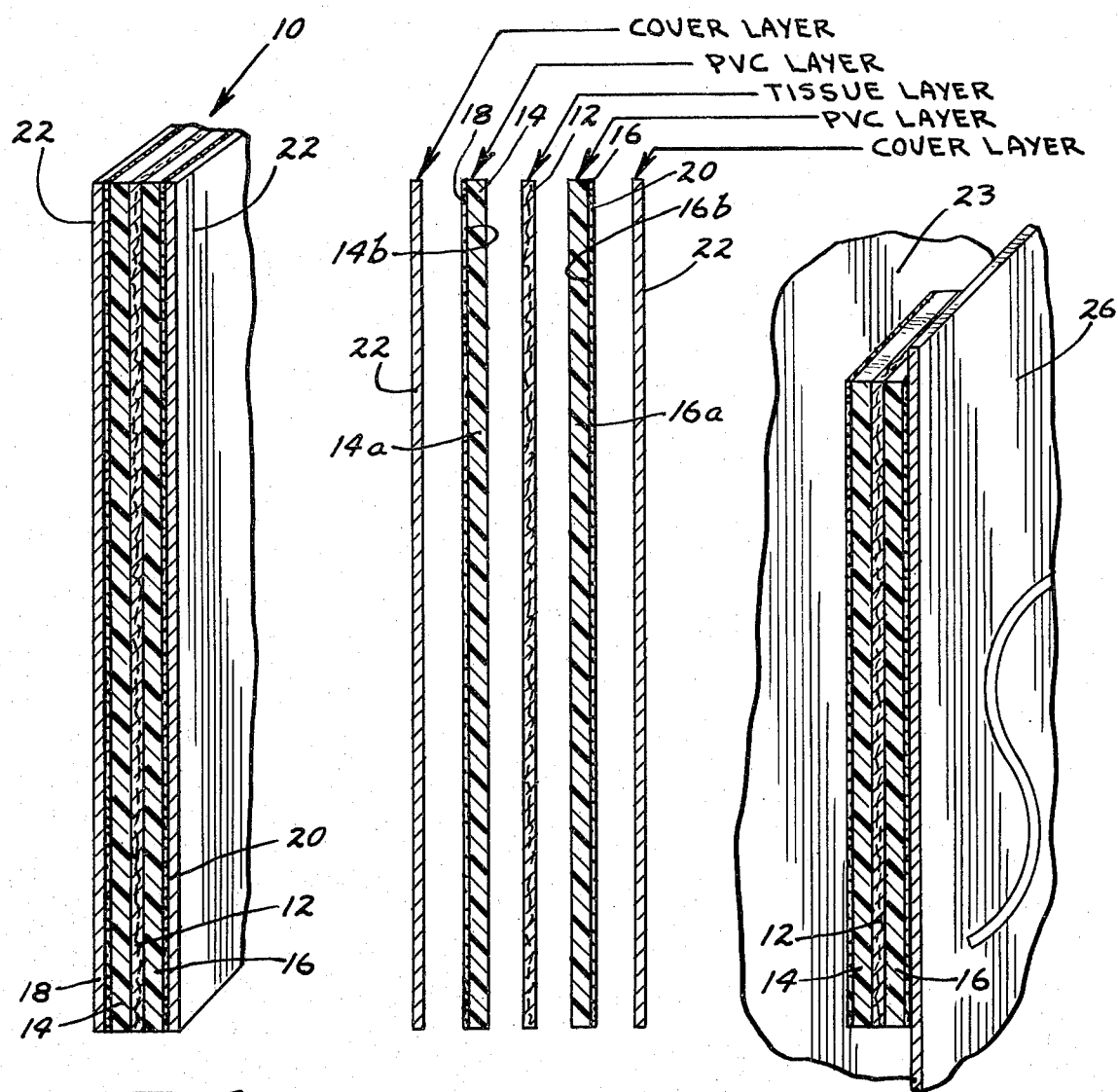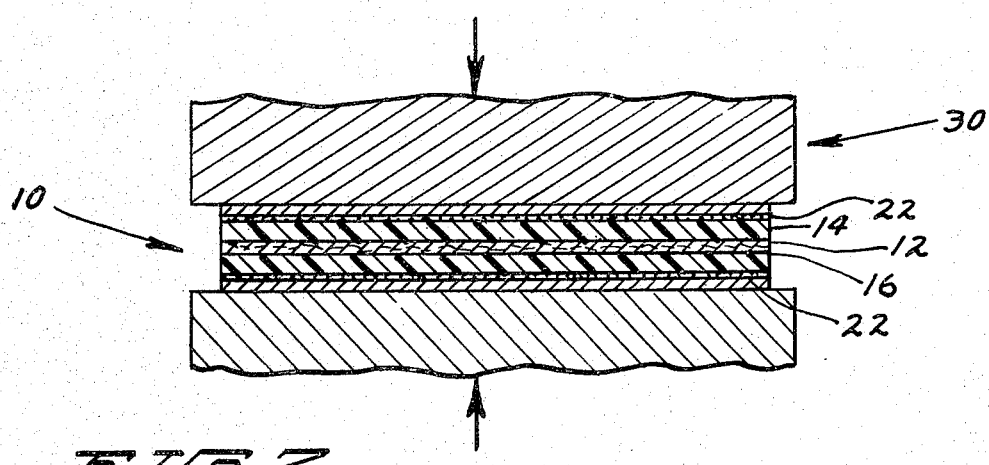

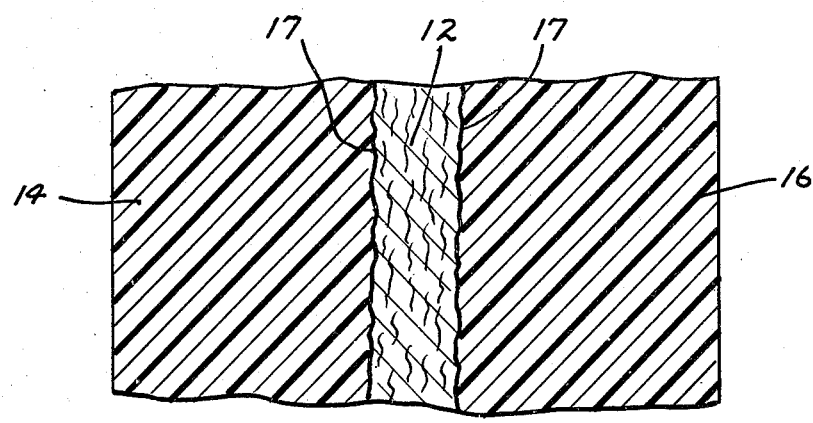
FIG. 8
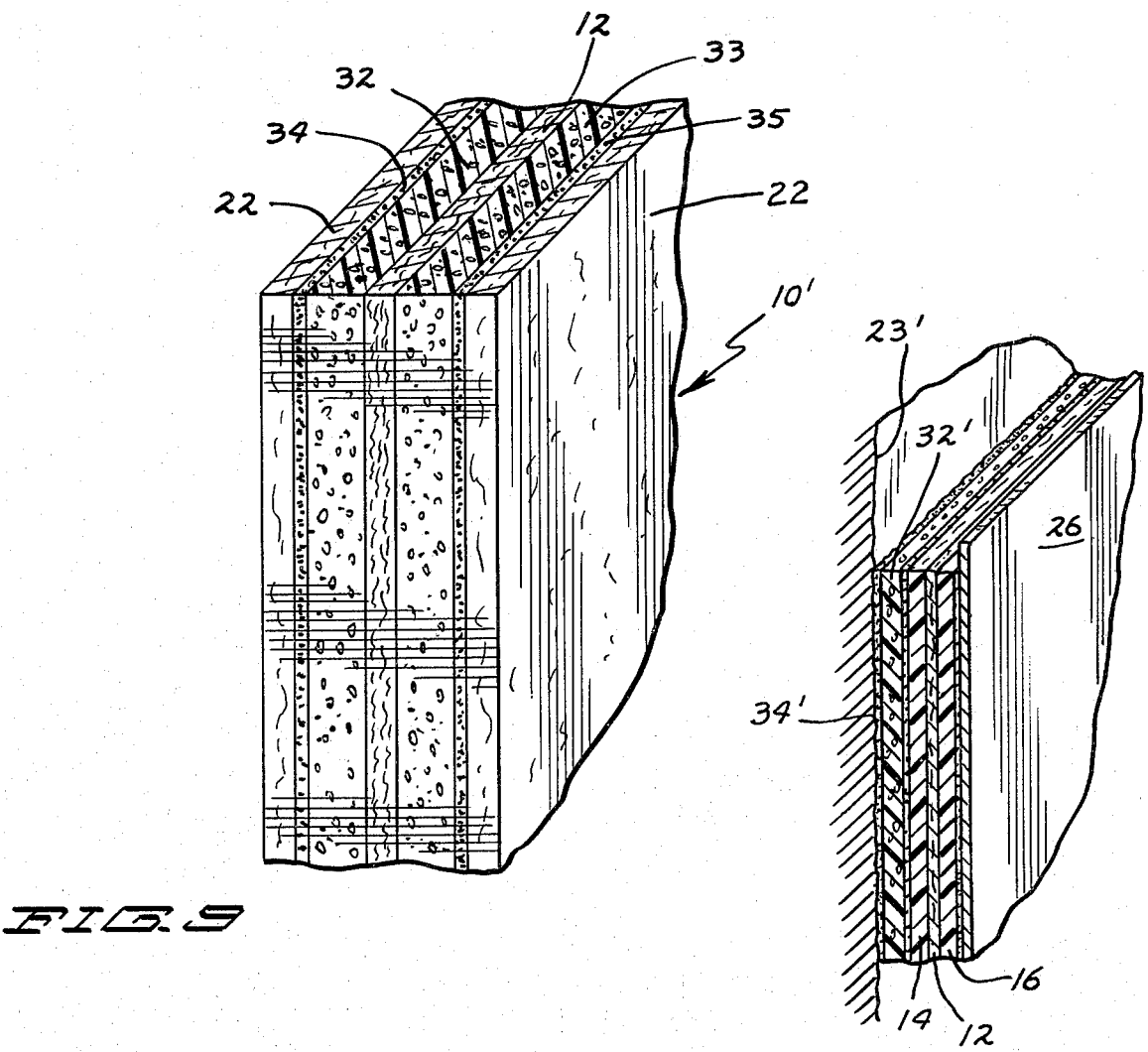
FIG. 9
FIG. 10

SELF HOLDING SEPARABLE MOUNT

BACKGROUND OF THE INVENTION

1. Field of Invention

This invention relates to a readily separable adhesive removable mount for securing objects to a supporting surface.

2. Description of the Prior Art

There are in common use adhesively secured mounts for holding objects to a supporting surface.

Generally such mounts are made to have both shear strength and tear strength whether made of a unitary piece of material or formed as a laminated structure having layers fused or bonded together. This is indicated generally in prior patents issued to the inventory herein with reference to his U.S. Pat. Nos. 3,098,272; 3,241,795; 3,311,339; 3,856,249; 3,885,768 and 4,003,538.

It is desirable to have an adhesively surfaced secured mount which is adapted to have substantial shear strength and to have a portion thereof having but slight tear strength for the ready removal of a held object and a portion of the mount whereby the remainder of the mount may be subsequently carefully removed.

SUMMARY OF THE INVENTION

This invention relates to an improvement in a holding member or mount particularly adapted to removably adhesively secure an object to a supporting surface and to provide for the ready removal of the object held and for the ready removal of the mount from the supporting surface without a deposit of residue on or damage to the supporting surface.

It is the purpose of the invention herein to provide a mount for general use such as mounting signs or posters onto a store window or display surface or other supporting surface wherein the shear strength of the mount is sufficient to provide a very substantial vertical hold and wherein the mount has a very nominal tear strength and is readily separable responsive to outward exertion upon the sign for its removal and the outer portion of the mount separates readily from a central layer thereof whereby the remainder of the mount may be carefully removed from the supporting surface without having the sign or other object held to deal with in removing the mount and without damage to the sign in removing it from its mounted position.

It is an object of this invention therefore to provide a mount comprising a plurality of dissimilar layers having outer opposed adhesive surfaces for attachment to a supporting surface and for attachment thereto of an object to be held, and having an intermediary layer having but slight tear strength for a medial separation of the mount whereby the outer portion of the mount is readily separated from the remainder thereof by an outward pull upon the outer layer thereof or upon the object held by said outer layer.

It is another object of the invention to provide a mount comprising a lamination of layers, the central layer thereof being impregnated by the surface portion of the adjacent layers to have but slight tear strength for a ready separation.

More specifically it is an object of the invention to provide a surface mount adhesively held in supporting position and adhesively supporting an object, said mount being comprised of a plurality of layers, the central layer thereof consisting of a layer of non-fusible material such as tissue paper, the adjacent layers at each side thereof being of a plastic fusible material such as flexible PVC, said mount being subjected to such heat and pressure as to impregnate said tissue paper with said adjacent surface portions of said PVC layers to cause said mount to have substantial shear strength but having very little tear strength providing a ready medial separation.

These and other objects and advantages of the invention will be set forth in the following description made in connection with the accompanying drawings in which like reference characters refer to similar parts throughout the several views.

BRIEF DESCRIPTION OF THE DRAWINGS

FIG. 1 is a view in plan with portions thereof shown in dotted line and a portion thereof in a partially separated position;

FIG. 2 is a view in vertical section taken on line 2—2 of FIG. 1 as indicated;

FIG. 3 is a view in vertical section with a portion thereof in a partially removed condition taken on line 3—3 of FIG. 1 as indicated;

FIG. 4 is a fragmentary view in perspective;

FIG. 5 is an exploded view in side elevation;

FIG. 6 is a fragmentary view in perspective shown in an operating position;

FIG. 7 is an end view of the device herein diagrammatically shown in a press.

FIG. 8 is a magnified fragmentary view showing a detail of structure;

FIG. 9 is a fragmentary view showing a modification; and

FIG. 10 is a fragmentary view showing another modification.

DESCRIPTION OF PREFERRED EMBODIMENT

Referring to the drawings, the holding member or mount, which is the subject matter of the invention herein, is indicated generally by the reference numeral 10.

In FIG. 5, said mount 10 is shown in an exploded view to separate the several layers comprising the mount for a clear showing thereof and for purpose of description.

As here shown, said mount 10 comprises a central layer 12 which is here indicated as being formed of a thin layer of non-fusible porous material such as tissue paper.

At each side of said layer 12 are layers 14 and 16 of a suitable flexible preferably plastic material such as a suitable form of PVC. It is essential that the layers 14 and 16 be formed of a material which is fusible under suitable heat and pressure and said layers will be put under such heat and pressure as to have their respective surface portions 14a and 16a impregnate said layer 12 to become secured thereto.

At the outward or remote surface portion 14b and 16b of said layers are adhesive coatings 18 and 20 which are applied in a manner well known to the art.

Overlying said adhesive coatings 18 and 20 are conventional protective cover strips 22 to protect the underlying adhesive coatings 18 and 20.

As indicated in FIG. 7, the mount 10 as above described is positioned in a suitable press 30 as diagrammatically shown. There will be an application of suitable heat and pressure as requried by the material used to cause the surface portions 14a and 16a to impregnate their respective facing surface portions of the layer 12 for the purpose which represents essential novelty of the mount herein. The impregnation 17 of the layer 12 by the adjacent surface portion of the layers 14 and 16 which is also indicated in FIG. 8 creates a bond which provides said mount with a considerable shear strength but with very nominal tear strength. Thus the layer 16 and the object held therby are readily separable from said layer 12 as the impregnation breaks away or the layer 12 ruptures or separates responsive to an outward pull as upon the object held by the layer 16 as indicated in FIG. 3. Said layer 12 in addition to being formed of a non-fusible porous material is also preferably formed of a readily rupturable or separable material such as tissue paper.

Referring to FIG. 4, the mount 10 is shown ready for use prior to the removal of the protective strips 22 and subsequent to the removal of said strips, said mount in FIG. 6 is shown in operating position secured to the supporting surface 23 as of a window or a wall and attached to said mount and adhesively held by said layer 16 is an object 26 indicated here as being a sign.

Once the layer 16 and the object held thereby are removed by separation of or from the tissue layer 12, the layer 14 is readily removed by being peeled away as indicated in FIG. 3. Thus the object held is readily removed without damage and the remainder of the mount can be peeled away conveniently from the supporting surface leaving no residue. There is no need to tear or jerk the sign and mount away from a supporting surface. The layer 12 provides substantial shear strength but very little tear strength.

The illustration of FIG. 3 is intended to indicate a two step removal. After the object 26 held is removed with a portion of the mount, then the remaining portion of the mount will be removed from the supporting surface. It will be understood that if the object 26 is rigid, that it will be removed accordingly and will not be curved upon removal as illustrated.

The above described embodiment of the invention herein has a very small cross sectional dimension or thickness and is most effectively used under the conditions in which the supporting surface and/or the object held have smooth surfaces. It has been found that the addition of one or more foam layers provides a more secure holding to an embossed or an irregular surface.

With reference to FIG. 9, a modification 10' is shown in which there has been substituted for the layers 14 and 16 foam layers 32 and 33 each having a thin PVC layer of surface covering facing said layer 12 and which are secured to the layer 12 as above described and said foam layers each have outward facing adhesive surface coatings 34 and 35.

Thus when said mount 10' is applied to a surface, the operator will press against the outer side thereof for an intimate engagement of the adhesive coating of said foam layer 32 and the adjacent supporting surface and in like manner an object is held by layer 33 by its adhesive coating 35. Said foam material may be made as of a suitable density of polyurethane.

Referring to FIG. 10, a modification is shown in which the structure of FIG. 6 is shown with a foam layer such as 32, indicated here as 32' having an adhesive coating 34' for adherence to the textured or embossed wall surface 23' and being added to overlay the outer adhesive side of the PVC layer 14 to provide a degree of yielding effect for intimate adherence to a textured surface.

It will be understood that within the concept herein is the combination of a foam layer and a PVC layer as may be desired for specific applications.

It will of course be understood that various changes may be made in the form, details, arrangement and proportions of the product without departing from the scope of applicant's invention which, generally stated, consists in a product capable of carrying out the objects above set forth, such as disclosed and defined in the appended claims.

What is claimed is:

1. A holding member for removably securing an object into a supporting surface comprising
    an intermediate layer of a non-fusible rupturable material,
    layers of a fusible material overlaying each side of said intermediate layer,
    the surface portions of said layers facing said intermediate layer impregnating said intermediate layer,
    means adhesively coating the surface portions of said layers remote from and facing outwardly of said intermediate layer, and
    a removable protective strip overlaying said last mentioned adhesively coated surface portions.

2. The structure of claim 1, wherein
    said layers of fusible material are formed of a suitable PVC material.

3. The structure set forth in claim 1, wherein
    a layer of suitable foam material overlays the outward side of at least one of said layers of fusible material, and
    means adhesively coating the outer side of said foam layer.

4. The structure of claim 1, wherein
    said intermediate layer is formed of a tissue paper.

* * * * *